Feb. 1, 1938.    H. S. GATES    2,106,838
ELECTRICAL APPARATUS
Filed Aug. 26, 1936
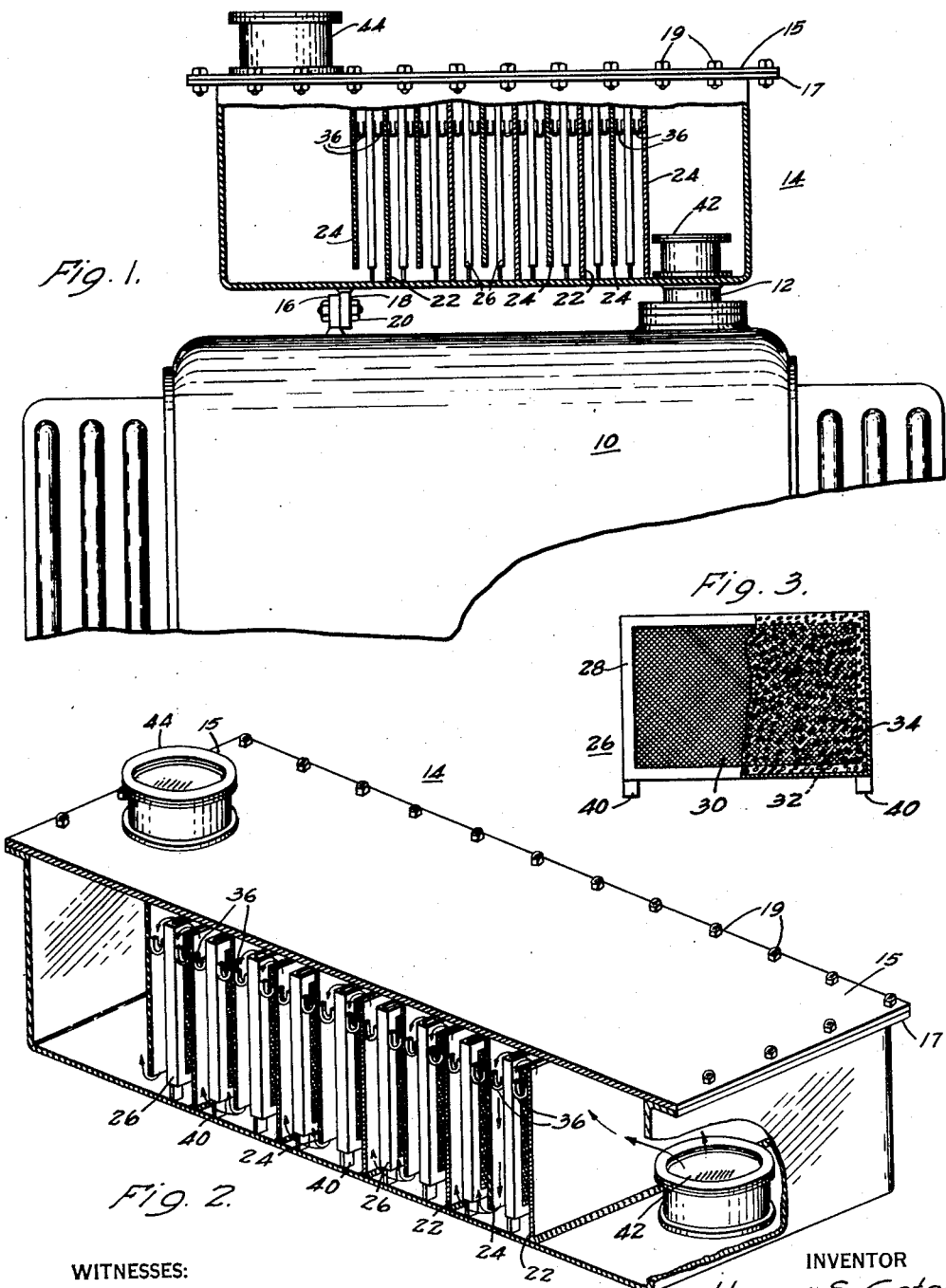
WITNESSES:
Michael Stark
James N. Ely
INVENTOR
Henry S. Gates.
BY Ezra W. Savage
ATTORNEY Patented Feb. 1, 1938

2,106,838

UNITED STATES PATENT OFFICE

2,106,838

ELECTRICAL APPARATUS

Henry S. Gates, Sharon, Pa., assignor to Westinghouse Electric & Manufacturing Company, East Pittsburgh, Pa., a corporation of Pennsylvania Application August 26, 1936, Serial No. 98,103

2 Claims. (Cl. 183—4)

This invention relates, generally, to electrical apparatus, and particularly to protective devices for electrical apparatus.

In electrical apparatus such as transformers, capacitors, switches or the like, a liquid which is decomposable in the presence of an electric arc is usually employed as the insulating and cooling medium for the electrical device. When the liquid is decomposed, obnoxious and irritating gases, such as hydrogen chloride gases, are evolved. In order to prevent the escape of the obnoxious gases to the atmosphere surrounding the electrical apparatus, it is desired to provide for efficiently absorbing the gases generated.

An object of this invention is to provide for absorbing the gases generated during the decomposition of the insulating medium associated with electrical apparatus.

Another object of this invention is the provision of an elongated path through which the gases generated during the decomposition of the insulating medium associated with an electrical apparatus may flow and of means in the elongated path for efficiently absorbing the gases.

Other objects of this invention will become apparent from the following description, when taken in conjunction with the accompanying drawing, in which:

Figure 1 is a schematic view in elevation and partly in section of an electrical apparatus embodying the teachings of this invention;

Fig. 2 is an isometric view in elevation and partly in section of the protective device embodying the teachings of this invention; and Fig. 3 is an elevational view, partly in section, of a tray of the gas absorbing material employed in the protective device shown in Fig. 2.

Referring to the drawing, and particularly to Figure 1 thereof, this invention is illustrated with reference to a transformer tank 10, which contains the usual core structure, windings, lead wires, and insulating medium, such as a halogenated hydrocarbon compound, or a mixture of such compounds or the like, not shown.

In order to absorb the gases generated during the operation of the electrical apparatus, the tank 10 is connected by means of a suitable conduit 12 to one end of an absorbing housing 14 which is suitably carried by the tank. The housing 14 comprises a bottom, side and end walls, which form a container for receiving the absorbing apparatus, as will be hereinafter described, and a top or cover 15 which is carried by the flange 17 at the top edge of the side and end walls and removably secured thereto by means of the bolts 19. Lugs 16 and 18 are so carried by the tank 10 and housing 14, respectively, that when the housing 14 is connected to the tank 10 by the conduit 12, the lugs may be secured by means of the bolts 20 to retain the housing in its operative position on the tank.

In order to provide an elongated path in the housing 14 for the flow of evolved gases, a series of baffle plates 22 and 24 are alternately disposed and carried by the bottom and cover of the housing, respectively. The baffle plates 22 and 24 are secured to the bottom and cover of the housing by some suitable means, such as by welding, and extend between and make a tight fit with the side walls of the housing and extend respectively to a point adjacent the cover and the bottom of the housing to provide a plurality of sections which progressively receive the gases from the electrical apparatus. The spaces between the free end of the baffle plate 22 and the cover 15, and between the free end of the baffle plate 24 and the bottom of the housing 14, provide openings for the ingress and egress of the gases to the sections. As will be seen from an examination of the drawing, the openings for the ingress of the gases to each of the sections progressively alternates from the top of the section to the bottom of the section.

As shown in Fig. 2 of the drawing, a tray or cell 26 is disposed in each section through which the gases flow. In the particular embodiment shown in Fig. 3, the cell 26 comprises a channel frame 28 which supports screen covers 30 and 32 to form a receptacle for receiving a filler of suitable gas-absorbing material 34, such as the hydroxides of alkaline metals. The hydroxides are to be preferred since the reaction product is water. Sodium hydroxide, potassium hydroxide and calcium hydroxide and the hydroxide known as soda-lime are some of the preferred gas-absorbing materials although satisfactory results may be obtained through the use of sodium carbonate, potassium carbonate or calcium oxide. In practice, the top edge of the channel frame 28 may be open to facilitate the renewal of the gas-absorbing filler.

In order to easily replace or supply cells of fresh gas absorbing material in the sections, the cells are removably disposed between adjacent baffle plates 22 and 24 and held in spaced relation thereto as by means of the lugs 36 carried on opposite sides of the frame of the cell. Other guide means, such as suitable grooves (not shown) in the side walls of the housing, may be employed instead of the lugs.

In order to provide for the passage of the gases completely around the cells 26, they are held in spaced relation to the bottom of the housing 14 by means of the lugs 40 carried on the bottom of the channel frame 28. The trays or cells are of such a size that a similar space is also provided between the top edge of the cell and the cover 15 of the housing.

During normal operation of the electrical apparatus, the gases are not always generated in quantities sufficient to necessitate their removal. It is, therefore, desirable to provide for protecting the gas absorbing material 34 in the housing from the normally evolved gases which, in the course of time, would cause the material to become inactive. In order to provide for the protection of the gas absorbing material during the normal operation of the electrical apparatus, a frangible gas-impervious diaphragm 42 of glass or similar material which is adapted to be ruptured upon the occurrence of predetermined pressures, is disposed in the end of the conduit 12.

The number of sections and the number of trays or cells 26 of gas absorbing material provided in the housing may be determined by the rate of absorption of the gases which it is desired to secure. Since it is not always practical to determine the exact amount of gas absorbing material necessary for absorbing the gases which may be generated, it is desirable to provide a relief valve for relieving the pressure which may sometimes be encountered in the housing.

A relief valve 44 for providing the protection desired in the housing 14 may be disposed on the cover 15 of the housing at the end opposite the end containing the gas inlet. The relief valve 44 may comprise any suitable valve, such as a hinged valve adapted to be opened upon predetermined pressures, or a relief diaphragm adapted to be ruptured upon the occurrence of predetermined pressures. The relief valve 44, in addition to providing protection against excessive pressures in the housing 14, also provides for so sealing the housing from the outside atmosphere that the gas-absorbing material will not be contaminated by the moisture in the atmosphere.

Under normal operating conditions, the housing 14 containing the gas absorbing material will be sealed from the insulating medium carried in the tank 10. Where electric arcs, such as sometimes occur, are formed in the electrical apparatus, the gases evolved from the insulating medium may become of such a volume as to exert a pressure exceeding the predetermined rupture pressure of the inlet diaphragm 42. When this occurs, the diaphragm 42 is ruptured and the gases enter the housing 14 and flow through the different sections containing the cells 26 of absorbent material, as indicated by the arrows in Fig. 2 of the drawing.

As shown in Fig. 2, when the gases flow between the free end of the baffle plate 22 and the cover 15 of the housing, they divide and a portion of the gases flows between the top edge of the tray or cell 26 and the cover of the housing, to the other side of the cell of absorbent material. The gases thus flow downwardly across both faces of the cell of absorbent material to the opening between the baffle plate 24 and the bottom of the housing where they flow into the adjoining section. The gases continue to flow progressively through each section containing the cells of gas absorbing material until they are entirely absorbed.

Where a fast generation of the gases is expected, it is advisable to increase the number of sections to so elongate the path through which the gases flow and consequently the number of cells of gas absorbing material that the gases will all be absorbed before reaching the end of the housing in which the relief valve 44 is disposed. If, for any reason, the gases are not completely absorbed by the absorbent material, the relief valve 44 will function to relieve any excessive pressure in the housing 14.

By providing an electrical apparatus with the protective device described hereinbefore, the obnoxious and irritating gases sometimes encountered during abnormal operation of the apparatus are efficiently and quickly absorbed. From the description, it is evident that a protective device may be so constructed that the gases may all be absorbed in the protective device itself. Further, by providing the cells of gas absorbing material removably disposed in the elongated flow path in the protective device, renewal of the absorbing material may be easily accomplished.

Although this invention has been described with reference to a particular embodiment thereof, it is, of course, not to be limited thereto except insofar as is necessitated by the prior art and scope of the appended claims.

I claim as my invention:

1. In an absorber for use with an electrical apparatus containing a dielectric material which will evolve chemically active gases when decomposed, a housing comprising a cover, bottom, end and side walls integrally secured together for receiving the evolved gases, an inlet into the housing, a gas-impervious diaphragm capable of being ruptured by an abnormal rise in pressure of the evolved gases in the electrical apparatus disposed in the inlet wholly within an end of the housing for admitting the gases to the housing, baffles carried in spaced relation in the housing for directing the flow of evolved gases in the housing, said baffles being alternately disposed and carried by the cover and bottom of the housing and extending across the housing between the side walls to provide a plurality of sections having openings alternately at the top and bottom of the adjacent baffles forming the sections for the ingress and egress of the gases, a tray of gas absorbing material removably disposed in each of the sections for absorbing the gases as they flow through the housing, said tray comprising a channel member frame having an opening therein for receiving the gas absorbing material and side walls of screen carried by the frame for retaining the gas absorbing material and permitting free access of the gases thereto, means for retaining the tray in spaced relation to the adjacent baffles forming the section and to the cover and bottom of the housing for providing spaces therebetween for the flow of gases, and means for permitting the gases to escape from the housing when the pressure of the gases in the housing reaches a predetermined value.

2. In an absorber for use with an electrical apparatus containing a dielectric material which will evolve chemically active gases when decomposed, a housing comprising a cover, bottom, end and side walls integrally secured together for receiving the evolved gases, an inlet into the housing, a gas-impervious diaphragm capable of being ruptured by an abnormal rise in pressure of the evolved gases in the electrical apparatus disposed in the inlet wholly within an end of the housing for admitting the gases to the housing, baffles carried in spaced relation in the housing for directing the flow of evolved gases in the housing, said baffles being alternately disposed and carried by the cover and bottom of the housing and extending across the housing between the side walls to provide a plurality of sections having openings alternately at the top and bottom of the adjacent baffles forming the sections for the ingress and egress of the gases, a tray of gas absorbing material removably disposed in each of the sections for absorbing the gases as they flow through the housing, said tray comprising a channel member frame carrying side walls of screen for retaining the gas absorbing material and permitting free access of the gases thereto, means carried by the frame of the tray for positioning the tray in spaced relation to the adjacent baffles forming the section and to the cover and bottom of the housing for providing spaces therebetween for the flow of the gases, and means for permitting the gases to escape from the housing when the pressure of the gases in the housing reaches a predetermined value.

HENRY S. GATES.